United States Patent
Rumpf

(10) Patent No.: US 6,551,486 B2
(45) Date of Patent: Apr. 22, 2003

(54) PROCESS FOR GALVANIC DEPOSITING OF A DISPERSION LAYER ON A WORK PIECE SURFACE

(75) Inventor: Thomas Rumpf, Gmunden (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 09/858,707

(22) Filed: May 16, 2001

(65) Prior Publication Data

US 2002/0000381 A1 Jan. 3, 2002

(30) Foreign Application Priority Data

May 17, 2000 (AT) .................................................. 858/00

(51) Int. Cl.⁷ .............................................. C25D 15/00
(52) U.S. Cl. .............................. 205/109; 205/86; 205/98
(58) Field of Search ............................ 205/109, 86, 98, 205/170

(56) References Cited

U.S. PATENT DOCUMENTS 4,061,430 A * 12/1977 Herrnring .................... 401/216
4,561,787 A * 12/1985 Ehrentraut et al. ............ 384/26
5,501,786 A * 3/1996 Gremion et al. ............ 136/265

FOREIGN PATENT DOCUMENTS

| AT | 369 145 | 12/1982 |
| AT | 382 215 | 1/1987 |
| EP | 0 155 257 | 3/1989 |

OTHER PUBLICATIONS

Geankoplis, Christie. (Transport Processes and Unit Operations, 1993, no month available, Prentice Hall, 3rd Ed., pp. 88, 190–192).*

* cited by examiner

*Primary Examiner*—Nam Nguyen
*Assistant Examiner*—Wesley A. Nicolas
(74) *Attorney, Agent, or Firm*—Collard & Roe, P.C.

(57) ABSTRACT

A process for galvanic depositing of a dispersion layer on a surface of a work piece, in particular a contact layer on a plain bearing half liner, is described, where an electrolyte with the dispersed phase finely distributed therein is moved opposite the work piece surface to be coated with formation of a flow component parallel to the surface. In order to create advantageous processing conditions, the surface of the work piece to be coated is profiled prior to coating with an average minimum profile depth of 5 $\mu$m and is then coated transversely to a salient profile direction in a flow component of the electrolyte opposite the work piece surface.

9 Claims, 1 Drawing Sheet

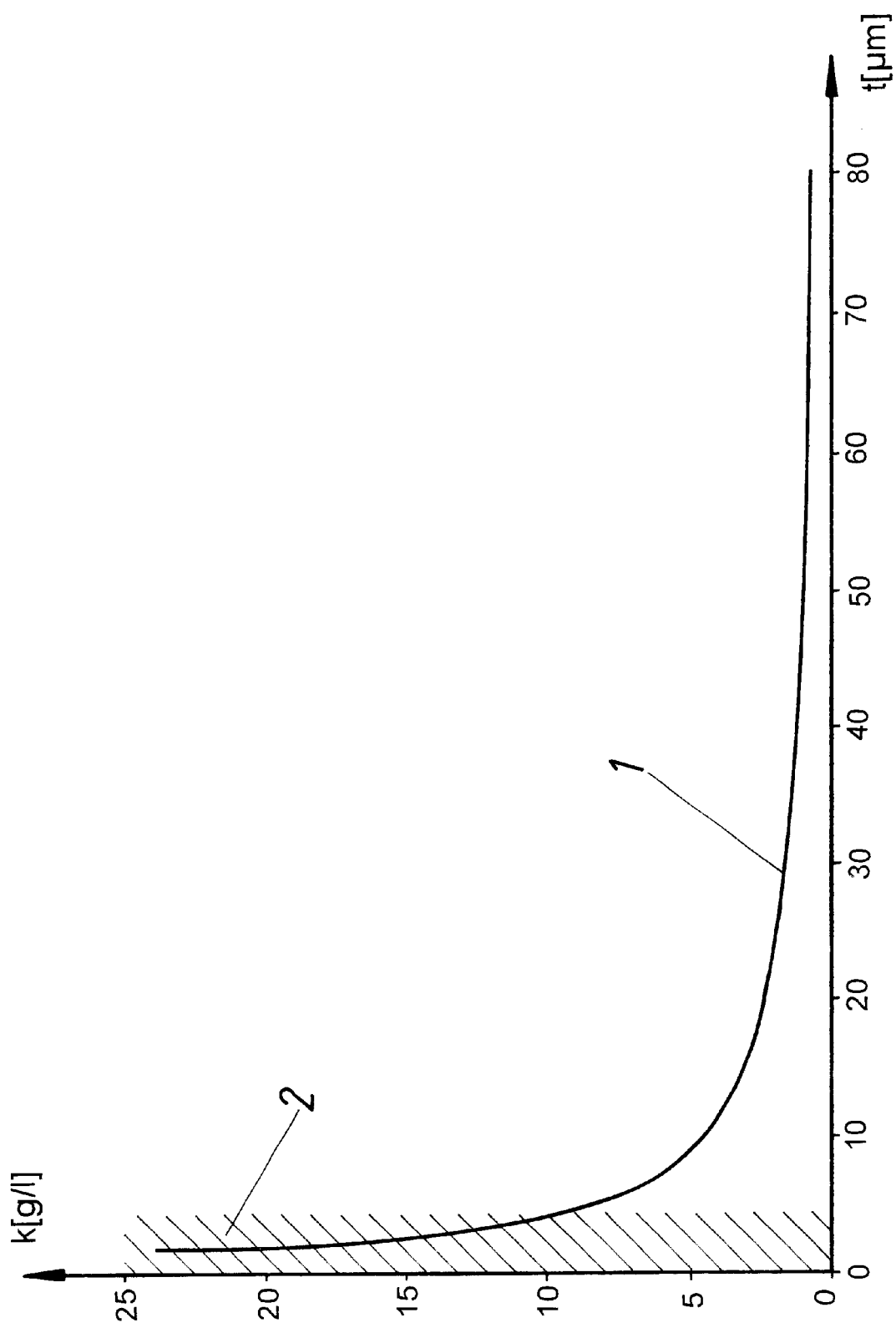

PROCESS FOR GALVANIC DEPOSITING OF A DISPERSION LAYER ON A WORK PIECE SURFACE

FIELD OF THE INVENTION

The present invention relates to a process for galvanic depositing of a dispersion layer on a surface of a work piece, in particular a contact layer on a plain bearing half liner, whereby an electrolyte with the dispersed phase finely distributed therein is moved opposite the work piece surface to be coated with formation of a flow component parallel to the surface.

DESCRIPTION OF THE PRIOR ART

The properties of dispersion layers can be adapted to various requirements by means of the dispersed phase, which comprises a wide range of particles at least substantially insoluble in the layer matrix, stored in the layer matrix. In the case of contact layers of plain bearings the mechanical and corrosion-inhibiting properties can be considerably improved by use of corresponding dispersion of hard material particles in the layer matrix. However, influence is brought to bear on the sliding behavior with the use of dispersions which are softer compared to the layer matrix.

In order to be able to apply dispersion layers comparatively simply to work piece surfaces, it is known to deposit these layers galvanically. For this purpose the particles of the dispersed phase are distributed finely in a corresponding electrolyte, where they are kept in suspension during the electrolysis process by stirring, air injection or pumping. The particles come into contact with the surface to be coated and are dispersed through adsorption, electrostatic attraction and through mechanical inclusion in the dispersion layer. The dispersion rate depends on the content of the dispersed phase in the electrolyte, yet higher dispersion rates require superproportional increases in concentration of the dispersed phase in the electrolyte, whereby the expense required for uniform distribution of the particles to halt their tendency to sedimentation rises as the proportion of the dispersed phase in the electrolyte increases. Corresponding limits arise in the attempt to increase the phase concentration in the layer matrix by augmenting the phase portion in the electrolyte.

Another possibility for increasing the dispersion rate of the dispersed phase in the layer matrix consists of increasing the flow rate of the electrolyte compared to the work piece surface to be coated. Such increase in the flow rate though only leads to an optimum because the dispersion rate drops again, presumably because of the rinsing effect. In this respect, it should be considered that the viscosity of the electrolyte sharply increases with the reduction in grain size in the dispersed phase, resulting in added difficulties. Especially fine-grained dispersed phases in the dispersion layer are preferred.

SUMMARY OF THE INVENTION

The object of the present invention is to create a process for galvanic dispersion of a dispersion layer on a work piece surface, in particular a contact layer on a plain bearing half liner of the type initially described, such that dispersion layers, which exhibit a comparatively high proportion of a dispersed phase, can be dispersed with comparatively little expenditure.

The invention solves this problem by the fact that the surface of the work piece to be coated is profiled prior to coating with an average minimum profile depth of 5 $\mu$m and is then coated transversely to a relevant profile direction in a flow component of the electrolyte opposite the work piece surface.

Surprisingly, the portion of the dispersed phase dispersed in the layer matrix was able to be increased extraordinarily, without the necessity of augmenting the concentration of the dispersed phase in the electrolyte, by means of the profiling of the work piece surface to be coated with an average minimum profile depth of 5 $\mu$m in conjunction with a flow component of the electrolyte opposite the work piece surface transverse to a relevant profile direction The processing expenditure going into the electrolyte with an increase in the phase portion is accordingly superfluous. Not only can higher dispersion densities of the dispersed phase be achieved in the layer matrix, but also normal phase concentrations in the layer matrix with a considerably reduced processing expenditure are achieved through significant reduction of the phase portion in the electrolyte. The effect of the considerably improved dispersing of the dispersed phase in the layer matrix on account of the profiling of the work piece surface to be coated can presumably be attributed to flow turbulence shifting in the vicinity of this profiling, which dispersions of the dispersed phase in the precipitating layer matrix decidedly support. For such a method of operation the flow component must run obliquely to this profile direction when the latter is salient. It is understood in this respect that profile direction means the course of more or less connected profile ridges with profile troughs in between, as is the case with profiling by creases or grooves. Plain bearings having a fluted bearing layer for taking up a galvanically dispersed contact layer are already known from AT 369 145 B, AT 382 215 B, and EP 0 155 257, but these profiled work piece surfaces bearing a contact layer do not serve an increase in the portion of a dispersion phase in the contact layer, which presupposes an electrolysis flow obliquely to the grooves or creases, but rather fine distribution of locally varying properties.

If the work piece surface to be coated is not profiled with a salient profile direction, as can be accomplished by etching or abrasive-blasting of the work piece surface with forming profile peaks for instance, no consideration needs to be made of the inflow direction of the flow component of the electrolyte parallel to the surface opposite the work piece surface, because there is no preferred direction with respect to profiling and corresponding turbulence in the vicinity of the profiling is to be reckoned with in all flow directions. It is not the orientation of the profiling that matters here, but the influence of the profiling on the electrolyte flow in the surface region.

Although in the case of an average minimum profile depth of 5 $\mu$m a considerable increase in the dispersion rate of the dispersed phase can be established in the layer matrix, the desired effect can be substantially increased by significantly augmenting the average minimum profile depth. It is thus recommended that the surface of the work piece to be coated is profiled with an average minimum profile depth of 8 $\mu$m. In choosing the average minimum profile depth it is natural to consider the surface configuration required for the respective work piece, which in turn requires reworking of the galvanically deposited dispersion layer Since the dispersion rate of the dispersed phase in the layer matrix depends inter alia on the average profile depth, the content of the dispersed phase in the dispersion layer can be distributed differently over the work piece surface via the average depth in order to increase the stability of the contact surface in the peripheral region of the greatest stress of a plain bearing in comparison to the remaining areas, for example. For this purpose only the work piece surface to be coated needs to be profiled with various average profile depths. Another possibility of influencing the phase concentration in the layer matrix consists of blowing the electrolyte at different flow rates against the work piece surface to be coated in different areas, which also results in different properties of the deposited dispersion layer over the work piece surface. By controlling the flow rate of the electrolyte the phase content can be adjusted variously over the layer thickness. For this purpose only the flow rate of the electrolyte is altered compared to the work piece surface.

As already detailed, the fine grain size of the dispersed phase advantageous for the properties of the dispersion layer raises the viscosity of the electrolyte, such that the concentration of the dispersed phase has to be limited in the electrolyte for this reason. Despite this fact, dispersed phases with a grain size of less than 1 $\mu$m, preferably less than 0.5 $\mu$m, can be deposited finely distributed in adequate quantity in the dispersion layer, because the process can work with a comparatively small phase concentration in the electrolyte.

BRIEF DESCRIPTION OF THE DRAWING

The process according to the present invention will now be explained in greater detail with reference to the diagram which illustrates the fundamental connection between the phase concentration in the electrolyte and the average profile depth of the work piece surface to be coated for a predetermined phase concentration in the dispersion layer in the form of a characteristic line.

DESCRIPTION OF THE PREFERRED EMBODIMENT

From characteristic line 1, which is the phase concentration k in g/l laid off on the abscissa over the average profile depth measured in $\mu$m of a profiled surface to be coated, it can be directly inferred that with increasing average profile depth t the phase concentration in the electrolyte required for a constant phase concentration in the dispersion layer decreases superproportionally, such that the difficulties associated with a higher phase concentration in the electrolyte for higher phase concentrations in the dispersion layer can simply be avoided if a corresponding inflow of the profiled work piece surface is supplied by the electrolyte. The usual surface roughness of a plain bearing generally also determines the surface roughness of the bearing material layer on which the contact surface is galvanically deposited. Said area of roughness 2, for which a surface roughness can be given depending on the bearing diameter of up to 3.7 $\mu$m, is indicated in crosshatching in the diagram. It is shown that the profile depth of the work piece surface to be coated clearly must be raised above said area of surface roughness 2 to be able to utilize the inventive effect to advantage.

The improved precipitation effect of the dispersed phase is largely independent of the type of dispersed phase which may comprise different particles at least somewhat insoluble in the layer matrix, such as oxides, carbides, nitrides, borides, sulfides, graphite, surface-modified graphite (fluorinated graphite, for instance) and/or fluorohydrocarbon resins or their homologues. The particle size of the hard, non-metallic particles is generally less than 1 $\mu$m, 0.3 $\mu$m for example, while the particle size of the soft dispersions can be as much as 10 $\mu$m. By means of the process according to the present invention phase concentrations of up to 10% can be attained in the dispersion layer without difficulty. The phase portion will generally be limited to an area of 0.5 to 3% on account of the desired properties of the dispersion layer. As already mentioned, the desired effect depends on the inflow direction of the work piece surface in the profiling area with a preferred profiling direction, and an adequate flow component transverse to the profile direction must be established which can also be achieved if the main flow direction is at a sharp angle to the profile direction. The type of flow generation plays no role here, so the electrolyte flow can be set by stirring, injector effect, insufflation of gas, conductive devices or work piece movement.

In order to depict the inventive effect compared to bearing shells having a dispersion layer deposited galvanically in conventional manner, plain bearings manufactured according to the present invention were compared to each standard bearing under otherwise corresponding manufacturing conditions and also with respect to the phase concentration in the electrolyte and in the layer matrix of the standard bearing. The values are itemized in the following table, whereby the standard bearing showed a surface roughness of 2.8 $\mu$m. The relative flow rate between the electrolyte and the surface to be coated was 3 m/min.

| Test bearing | t [$\mu$m] | α | $k_e$ [%] | $k_s$ [%] |
| --- | --- | --- | --- | --- |
| drilled plain bearing with helical grooves | 45 | 90° ∀ 60° | 4 | 120 |
| drilled plain bearing with helical grooves | 8 | 90° ∀ 60° | 24 | 100 |
| cleared plain bearing | 8 | 90° ∀ 60° | 23 | 100 |
| cleared plain bearing | 7 | 0–360° | 25 | 100 |
| cleared plain bearing | 5.6 | 0–360° | 28 | 100 |

It is evident that with the test bearings according to the present invention the phase concentration $K_e$ in the electrolyte was able to be drastically lowered independently of the type of profiling with corresponding average profile depths t, without having to take losses in the phase content $k_S$ of the dispersion layer into consideration, if a corresponding inflow angle α opposite the profile direction is provided for. The angle range α=0–360° was given for the test bearings with profiling without a preferred direction.

Comparable ratios result with a standard bearing having a surface roughness of 3.7 $\mu$m and an electrolyte flow rate compared to the surface to be coated of 1 m/min, as revealed in the following table.

| Test bearing | t [$\mu$m] | α | $k_e$ [%] | $k_s$ [%] |
| --- | --- | --- | --- | --- |
| drilled plain bearing with helical grooves | 20 | 90° ∀ 45° | 5 | 120 |
| abrasion-blasted plain bearing | 15 | 0–360° | 10 | 110 |
| milled plain bearing | 11 | 0–360° | 19 | 120 |
| knurled plain bearing | 13 | 0–360° | 16 | 100 |

What is claimed is:
1. A process for the galvanic deposition of a dispersion layer on a surface of a workpiece, which comprises the steps of
   (a) moving an electrolyte with a dispersed phase finely distributed therein over, and relative to, the workpiece surface to coat the workpiece surface, the moving electrolyte with the dispersed phase forming a flow component parallel to the workpiece surface, and (b) profiling the workpiece surface with an average minimum profile depth of 5 μm prior to moving the electrolyte with the dispersed phase therover, the flow component running transversely to a salient profile direction.

2. The process of claim 1 wherein the workpiece surface is a contact layer on a plain bearing half liner.

3. The process of claim 1, wherein the workpiece surface is profiled with an average minimum profile depth of 8 μm.

4. The process of claim 1 wherein the workpiece surface is profiled with a varying average minimum profile depth.

5. The process of claim 1, wherein the electrolyte with the dispersed phase is moved in different areas of the workpiece surface at varying flow rates.

6. The process of claim 1, wherein the electrolyte with the disposed phase is moved over time at different flow rates.

7. The process of claim 1, wherein the dispersed phase has a grain size of less than 1 μm.

8. The process of claim 7, wherein the dispersed phase has a grain size of less than 0.5 μm.

9. The process of claim 1, wherein the concentration of the dispersed phase in the dispersion layer is from 0.5–10%.

\* \* \* \* \*